(12) United States Patent
Wang et al.

(10) Patent No.: US 12,220,898 B2
(45) Date of Patent: Feb. 11, 2025

(54) THERMOPLASTIC ROOFING MEMBRANES ADAPTED FOR ADHESION TO POLAR ADHESIVES

(71) Applicant: Firestone Building Products Company, LLC, Nashville, TN (US)

(72) Inventors: Hao Wang, Carmel, IN (US); Donna C. Tippmann, Fishers, IN (US)

(73) Assignee: Holcim Technology Ltd, Zug (CH)

( * ) Notice: Subject to any disclaimer, the term of this patent is extended or adjusted under 35 U.S.C. 154(b) by 1044 days.

(21) Appl. No.: 17/266,277

(22) PCT Filed: Aug. 7, 2019

(86) PCT No.: PCT/US2019/045384
§ 371 (c)(1),
(2) Date: Feb. 5, 2021

(87) PCT Pub. No.: WO2020/033462
PCT Pub. Date: Feb. 13, 2020

(65) Prior Publication Data
US 2021/0300007 A1    Sep. 30, 2021

Related U.S. Application Data

(60) Provisional application No. 62/716,043, filed on Aug. 8, 2018.

(51) Int. Cl.
| | |
|---|---|
| *B24B 1/00* | (2006.01) |
| *B29C 48/00* | (2019.01) |
| *B29C 48/08* | (2019.01) |
| *B29C 48/15* | (2019.01) |

(Continued)

(52) U.S. Cl.
CPC ............ *B32B 27/20* (2013.01); *B29C 48/001* (2019.02); *B29C 48/0021* (2019.02);
(Continued)

(58) Field of Classification Search
CPC ....... B24B 1/00; B29C 48/001; B29C 48/022; B29C 48/15; B29C 48/21; B29K 2023/06;
(Continued)

(56) References Cited

U.S. PATENT DOCUMENTS

| | | | |
|---|---|---|---|
| 3,543,362 A | * 12/1970 | Steding | .................... C25D 1/00 407/29.14 |
| 4,141,187 A | 2/1979 | Graves | |

(Continued)

FOREIGN PATENT DOCUMENTS

| | | |
|---|---|---|
| CN | 101668808 A | 3/2010 |
| EP | 1245620 A2 | 10/2002 |

(Continued)

OTHER PUBLICATIONS

Pollen, "Natural organic fillers", May 10, 2021, at https://www.pollen.am/fillers_mineral/, archived at https://web.archive.org/web/20240214222626/https://www.pollen.am/fillers_mineral/, p. 2 (Year: 2021).*

(Continued)

*Primary Examiner* — Leo B Tentoni
(74) *Attorney, Agent, or Firm* — Renner, Kenner; Arthur M. Reginelli

(57) ABSTRACT

A method of preparing a thermoplastic roofing membrane, the method comprising (i) extruding a composition including a thermoplastic polymer and a mineral filler to form an extrudate; (ii) forming the extrudate into a sheet having first and second planar surfaces; (iii) allowing the sheet to at least partially cool; and (iv) mechanically treating the first planar surface of the sheet to thereby expose the mineral filler.

11 Claims, 2 Drawing Sheets

(51) Int. Cl.
| | |
|---|---|
| *B29C 48/21* | (2019.01) |
| *B29C 48/88* | (2019.01) |
| *B32B 7/12* | (2006.01) |
| *B32B 27/12* | (2006.01) |
| *B32B 27/20* | (2006.01) |
| *B32B 27/32* | (2006.01) |
| *B32B 37/15* | (2006.01) |
| *B32B 37/20* | (2006.01) |
| *B32B 38/00* | (2006.01) |
| *C08K 3/26* | (2006.01) |
| *C09J 175/04* | (2006.01) |
| *E04D 5/10* | (2006.01) |
| *E04D 5/14* | (2006.01) |
| *B29K 23/00* | (2006.01) |
| *B29K 101/12* | (2006.01) |
| *B29K 509/00* | (2006.01) |
| *B29K 509/02* | (2006.01) |
| *B29L 31/10* | (2006.01) |

(52) U.S. Cl.
CPC ............ *B29C 48/022* (2019.02); *B29C 48/08* (2019.02); *B29C 48/9135* (2019.02); *B32B 7/12* (2013.01); *B32B 27/12* (2013.01); *B32B 27/32* (2013.01); *B32B 37/153* (2013.01); *B32B 37/203* (2013.01); *B32B 37/206* (2013.01); *B32B 38/0012* (2013.01); *C08K 3/26* (2013.01); *C09J 175/04* (2013.01); *E04D 5/10* (2013.01); *E04D 5/148* (2013.01); *B29K 2023/06* (2013.01); *B29K 2023/08* (2013.01); *B29K 2023/10* (2013.01); *B29K 2023/14* (2013.01); *B29K 2101/12* (2013.01); *B29K 2509/00* (2013.01); *B29K 2509/02* (2013.01); *B29L 2031/108* (2013.01); *B32B 2038/0016* (2013.01); *B32B 2250/03* (2013.01); *B32B 2250/40* (2013.01); *B32B 2264/104* (2013.01); *B32B 2419/06* (2013.01); *C08K 2003/265* (2013.01)

(58) Field of Classification Search
CPC ............ B29K 2023/08; B29K 2023/10; B29K 2023/14; B29K 2509/00; B29L 2031/108; B32B 37/153; B32B 37/20; B32B 37/203; B32B 37/206; B32B 38/0012; B32B 2038/0016
USPC .... 264/162, 171.13, 171.23, 171.24, 211.12; 156/244.11, 244.19, 244.24; 451/28
See application file for complete search history.

(56) References Cited

U.S. PATENT DOCUMENTS

| | | |
|---|---|---|
| 4,957,968 A | 9/1990 | Adur et al. |
| 5,437,923 A | 8/1995 | Kalkanoglu |
| 5,573,092 A | 11/1996 | Gabilondo |
| 5,624,999 A | 4/1997 | Lombardi et al. |
| 5,891,563 A | 4/1999 | Letts |
| 5,927,258 A | 7/1999 | Clauss et al. |
| 6,044,604 A | 4/2000 | Clayton et al. |
| 6,117,375 A | 9/2000 | Garrett et al. |
| 6,414,070 B1 | 7/2002 | Kausch et al. |
| 6,503,984 B2 | 1/2003 | Johnson et al. |
| 6,544,909 B1 | 4/2003 | Venkataswamy et al. |
| 6,656,982 B2 | 12/2003 | Yasuda |
| 6,720,067 B2 | 4/2004 | Takahashi et al. |
| 6,927,258 B2 | 8/2005 | Datta et al. |
| 7,355,089 B2 | 4/2008 | Chang et al. |
| 7,387,753 B2 | 6/2008 | Tackett et al. |
| 7,579,397 B2 | 8/2009 | Nelson |
| 7,612,120 B2 | 11/2009 | Letts |
| 7,666,491 B2 | 2/2010 | Yang |
| 7,741,397 B2 | 6/2010 | Liang et al. |
| 7,838,568 B2 | 11/2010 | Letts et al. |
| 7,882,671 B2 | 2/2011 | Bruce et al. |
| 7,893,166 B2 | 2/2011 | Shan et al. |
| 7,964,672 B2 | 6/2011 | Ouhadi |
| 8,440,284 B2 | 5/2013 | Kelly |
| 9,045,904 B2 | 6/2015 | Hubbard et al. |
| 9,434,827 B2 | 9/2016 | Frei et al. |
| 9,725,628 B2 | 8/2017 | McGrath |
| 10,907,355 B2 | 2/2021 | Hubbard et al. |
| 2002/0013379 A1 | 1/2002 | Singh et al. |
| 2002/0049266 A1 | 4/2002 | Yasuda |
| 2003/0032351 A1 | 2/2003 | Horner |
| 2003/0082365 A1 | 5/2003 | Geary et al. |
| 2003/0153656 A1 | 8/2003 | Sjerps |
| 2003/0198813 A1 | 10/2003 | Howell |
| 2004/0033741 A1 | 2/2004 | Peng |
| 2004/0109983 A1 | 6/2004 | Rotter et al. |
| 2004/0146681 A1 | 7/2004 | Naipawer, III et al. |
| 2004/0192130 A1 | 9/2004 | Baciu et al. |
| 2004/0198912 A1 | 10/2004 | Dharmarajan et al. |
| 2004/0248751 A1 | 12/2004 | Johnson et al. |
| 2005/0183365 A1 | 8/2005 | Naipawer, III et al. |
| 2006/0046084 A1 | 3/2006 | Yang et al. |
| 2006/0127664 A1 | 6/2006 | Geary et al. |
| 2006/0179749 A1 | 8/2006 | Brandt et al. |
| 2006/0199930 A1 | 9/2006 | Li Pi Shan et al. |
| 2007/0193167 A1 | 8/2007 | Bruce et al. |
| 2007/0194482 A1 | 8/2007 | Douglas et al. |
| 2008/0179574 A1 | 7/2008 | Yang et al. |
| 2008/0206583 A1 | 8/2008 | Phan et al. |
| 2008/0299351 A1* | 12/2008 | Buchholtz ............... E04F 15/10 264/238 |
| 2009/0049802 A1 | 2/2009 | Johnson et al. |
| 2009/0137168 A1 | 5/2009 | Peng |
| 2009/0181216 A1 | 7/2009 | Peng |
| 2009/0255573 A1 | 10/2009 | Taylor |
| 2009/0269565 A1 | 10/2009 | Peng |
| 2009/0275690 A1 | 11/2009 | Weaver et al. |
| 2010/0029827 A1 | 2/2010 | Ansems et al. |
| 2010/0084158 A1 | 4/2010 | Gau et al. |
| 2010/0125114 A1 | 5/2010 | Williams et al. |
| 2010/0197844 A1 | 8/2010 | Yang et al. |
| 2011/0003094 A1 | 1/2011 | Becker |
| 2011/0118404 A1 | 5/2011 | Jung et al. |
| 2011/0139340 A1 | 6/2011 | Naipawer, III et al. |
| 2011/0206973 A1 | 8/2011 | Brandt et al. |
| 2012/0045623 A1 | 2/2012 | Delaney |
| 2012/0167510 A1 | 7/2012 | Brandt et al. |
| 2012/0244340 A1 | 9/2012 | Peng |
| 2013/0036694 A1 | 2/2013 | Brandt et al. |
| 2013/0164524 A1 | 6/2013 | Letts et al. |
| 2013/0252005 A1 | 9/2013 | Savargaonikar et al. |
| 2013/0296497 A1 | 11/2013 | Jeong et al. |
| 2014/0011008 A1 | 1/2014 | Letts et al. |
| 2014/0127443 A1 | 5/2014 | Zhou |
| 2014/0150960 A1 | 6/2014 | Peng |
| 2014/0302295 A1 | 10/2014 | Thies et al. |
| 2014/0373467 A1 | 12/2014 | Wang et al. |
| 2015/0038629 A1 | 2/2015 | Ultsch |
| 2015/0119515 A1 | 4/2015 | Frei et al. |
| 2015/0152643 A1 | 6/2015 | Hubbard |
| 2015/0174871 A1 | 6/2015 | Sollmann |
| 2015/0314511 A1 | 11/2015 | Stoiljkovic et al. |
| 2016/0024794 A1 | 1/2016 | Jenkins et al. |
| 2016/0207283 A1 | 7/2016 | Wang |
| 2016/0312470 A1 | 10/2016 | Wang et al. |
| 2017/0044770 A1 | 2/2017 | Hubbard et al. |
| 2017/0203555 A1 | 7/2017 | Wang et al. |
| 2018/0023301 A1 | 1/2018 | Wang et al. |
| 2018/0094439 A1 | 4/2018 | Wang et al. |
| 2018/0162109 A1 | 6/2018 | Gopalan et al. |
| 2018/0162971 A1 | 6/2018 | Chen et al. |
| 2018/0290433 A1 | 10/2018 | Gossi |
| 2018/0291347 A1 | 10/2018 | Tom et al. |
| 2018/0355616 A1 | 12/2018 | Hubbard et al. |
| 2019/0003184 A1 | 1/2019 | Wang et al. |

(56) References Cited

U.S. PATENT DOCUMENTS

2019/0003185 A1    1/2019   Wang et al.
2019/0084253 A1*   3/2019   Solecki .................. B29C 70/64
2019/0352517 A1*   11/2019  Xia ........................ C08G 77/04

FOREIGN PATENT DOCUMENTS

| EP | 1655331 A1 | 5/2006 |
|---|---|---|
| JP | 04-351542 A | 12/1992 |
| WO | 2001066627 A1 | 9/2001 |
| WO | 2001096110 A1 | 12/2001 |
| WO | 2003016168 A1 | 2/2003 |
| WO | 2007136761 A1 | 11/2007 |
| WO | 2013102208 A1 | 7/2013 |
| WO | 2014001224 A1 | 1/2014 |
| WO | 2014008501 A1 | 1/2014 |
| WO | 2014078760 A1 | 5/2014 |
| WO | 2014105809 A1 | 7/2014 |
| WO | 2015089384 A1 | 6/2015 |
| WO | 2015164852 A1 | 10/2015 |
| WO | 2017-108844 A1 | 6/2017 |
| WO | 2017-108846 A1 | 6/2017 |
| WO | 2019106117 A1 | 6/2019 |
| WO | 2020163844 A1 | 8/2020 |

OTHER PUBLICATIONS

Supplementary European Search Report for EP Application No. 19847259.9 dated Feb. 28, 2022.
International Search Report and Written Opinion for Appl. No. PCT/US2014/069988 dated Mar. 5, 2015, p. 1-4.
ASTM D 6878-03 standard, 2003, 3 Pages. (Year: 2003).
International Search Report and Written Opinion for Appl. No. PCT/US2016/016975 dated Apr. 26, 2016.
International Search Report and Written Opinion for Appl. No. PCT/US2015/027698 dated Jul. 30, 2015. pp. 1-10.
International Search Report and Written Opinion for Appl. No. PCT/US2015/041707 dated Sep. 8, 2015, pp. 1-3.
International Search Report and Written Opinion for Appl. No. PCT/US2016/069073 dated Apr. 3, 2017, pp. 1-10.
International Search Report and Written Opinion for Appl. No. PCT/US2016/016960 dated Apr. 26, 2016.
Thermal Tech Equipment. Shore Durometer Conversion Chart, Jun. 13, 2003, p. 1.
U.S. Appl. No. 15/548,912, filed Aug. 4, 2017.
U.S. Appl. No. 15/548,938, filed Aug. 4, 2017.
U.S. Appl. No. 15/306,537, filed Oct. 25, 2016.
U.S. Appl. No. 16/108,282, filed Aug. 22, 2018.
U.S. Appl. No. 16/066,699, filed Jun. 28, 2018.
U.S. Appl. No. 16/066,828, filed Jun. 28, 2018.
U.S. Appl. No. 15/103,542, filed Jun. 10, 2016.
U.S. Appl. No. 15/327,867, filed Jan. 20, 2017.
PCT Application No. PCT/US2020/013529, (Jan. 14, 2020).
PCT Application No. PCT/US2020/017410, (Aug. 13, 2020).
International Search Report and Written Opinion for related PCT/US2019/045384 dated Nov. 26, 2019 (12 pps).

* cited by examiner

THERMOPLASTIC ROOFING MEMBRANES ADAPTED FOR ADHESION TO POLAR ADHESIVES

This application claims the benefit of U.S. Provisional Application Ser. No. 62/716,043, filed on Aug. 8, 2018, which is incorporated herein by reference

FIELD OF THE INVENTION

Embodiments of the present invention are directed toward thermoplastic membranes that are adapted for adhesion to polar adhesives. The membranes of this invention include an abraded surface that exposes mineral fillers to the surface of the membrane and thereby increases chemical bonding between the polar adhesive and the mineral filler.

BACKGROUND OF THE INVENTION

Polymeric membranes, such as cured sheets of ethylene-propylene-diene copolymer rubber (EPDM) or extruded sheet of thermoplastic olefins (TPO), are often used in the construction industry to cover flat or low-sloped roofs. These membranes, which may also be referred to as panels, are typically delivered to a construction site in a bundled roll, transferred to the roof, and then unrolled and positioned. The sheets are then affixed to the building structure by employing various techniques such as mechanical fastening, ballasting, and/or adhesively adhering the membrane to the roof. The roof substrate to which the membrane is secured may include a variety of materials depending on the situation. For example, the surface may be a concrete, metal, or wood deck, it may include insulation or recover board, and/or it may include an existing membrane.

In addition to securing the membrane to the roof—which mode of attachment primary seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water-resistant seal.

With respect to affixing the membrane to the building structure, adhesive attachment forms an adhered roofing system. The membrane may be adhered to the roof substrate substantially across the entire planar surface of the membrane to form fully-adhered systems. In other words, a majority, if not all, of the membrane panel is secured to the roof substrate as opposed to mechanical attachment methods, which can only achieve direct attachment in those locations where a mechanical fastener actually affixes the membrane. Fully-adhered roofing systems are advantageously installed where maximum wind uplift prevention is desired. Also, fully-adhered systems are desirable in re-roofing situations, especially where the new membrane is placed over an existing membrane (a technique that is commonly referred to as re-skinning).

Several techniques are employed to prepare fully-adhered roofing systems. One technique includes the use of fleece-backed membranes that are secured to the substrate by using a low-rise polyurethane foam adhesive that is sprayed over the substrate as described in U.S. Pat. No. 4,996,812. Once the adhesive polyurethane foam is applied, the fleece-backed membrane is applied to the adhesive layer, which attaches itself to the fleece backing. In lieu of low-rise foams, silicone or siloxy-terminated polymer adhesives, such as those described in U.S. Publ. Nos. 2016/0312471, 2017/0210091, and 2007/0088137 can be used. Because these systems require fleece-backed membranes, they are expensive and suffer from manufacturing inefficiencies relating to the need to secure the fleece to the membrane.

Other techniques employ conventional membrane sheet, such as EPDM sheet, that is not modified with a fleece backing. In these situations, it is common to employ a contact bonding method whereby technicians coat both the membrane and the substrate that receives the membrane with an adhesive. The adhesive is then typically allowed to at least partially set to, among other things, build some wet green strength. The membrane is then mated with the substrate via the partially-set adhesive. Because the volatile components (e.g. solvent) of the adhesives are "flashed off" prior to mating, good, early (green) bond strength can advantageously be developed.

Other techniques employ water-borne bond adhesives that are applied to the substrate and then the EPDM membrane can be applied to the adhesive layer. While this attachment technique has proven useful, its applicability is generally limited to ambient weather conditions (e.g. greater than 40° C.) and/or in conjunction with porous substrates that absorb water thereby allowing the adhesive to dry or cure without blistering the membrane.

Since techniques for adhesively bonding membranes to roof surfaces known heretofore have shortcomings, these is a desire for improved membrane attachment techniques.

SUMMARY OF THE INVENTION

One or more embodiments of the present invention provide a method of preparing a thermoplastic roofing membrane, the method comprising (i) extruding a composition including a thermoplastic polymer and a mineral filler to form an extrudate; (ii) forming the extrudate into a sheet having first and second planar surfaces; (iii) allowing the sheet to at least partially cool; and (iv) mechanically treating the first planar surface of the sheet to thereby expose the mineral filler.

Yet other embodiments of the present invention provide a thermoplastic roofing membrane comprising (i) a first thermoplastic layer, where said first thermoplastic layer includes first and second planar surfaces, and where said first thermoplastic layer includes mineral filler; (ii) an optional reinforcing fabric adjacent to said second planar surface of said first thermoplastic layer; (iii) a second thermoplastic layer laminated to said second planar surface of said first thermoplastic layer, where said first planar surface of said first thermoplastic layer is a mechanically-treated surface that exposes the mineral filler contained within the layer.

Still other embodiments of the present invention provide a roofing system comprising a substrate; and a thermoplastic membrane adhesively mated to said substrate through a polar adhesive, said polar adhesive adhesively mating the membrane along a mechanically treated surface that exposes mineral filler within the membrane.

DETAILED DESCRIPTION OF ILLUSTRATIVE EMBODIMENTS

Embodiments of the present invention are based, at least in part, on the discovery of a thermoplastic membrane that includes an abraded surface that exposes mineral filler contained within the membrane. By exposing the mineral filler, it has unexpectedly been found that the thermoplastic membranes of the present invention can be adhered by using polar adhesive systems in the absence of a fleece backing. This adhesion may advantageously include adhesion to a roof substrate (i.e. membrane attachment) or to adjacent thermoplastic membranes (i.e. seaming). While the prior art contemplates the use of polar adhesives, such as polyurethane low-rise foams and silicon-containing adhesives, the adhesion to thermoplastic membranes (particularly olefin-based membranes) that has been achieved in the absence of a fleece backing has not met industry standards and is therefore not commercially viable. It is believed that the unexpected results that have been observed in practicing the present invention derive, at least in part, from exposing the mineral fillers contained within and encased by the olefin material. Specifically, it is believed that mineral filler at or near the bonding surface plays an important role in the adhesion mechanism with the polar adhesives. It is now believed that the flow properties of the thermoplastic resin that is used to fabricate the membranes encapsulates or otherwise coats the mineral fillers during fabrication of the membrane and thereby interferes with the ability of the filler to take part in the adhesion mechanism. Practice of the present invention overcomes these obstacles and provides thermoplastic roofing systems with improved adhesion using polar-based adhesives.

Thermoplastic Membrane Construction

Figure 1:
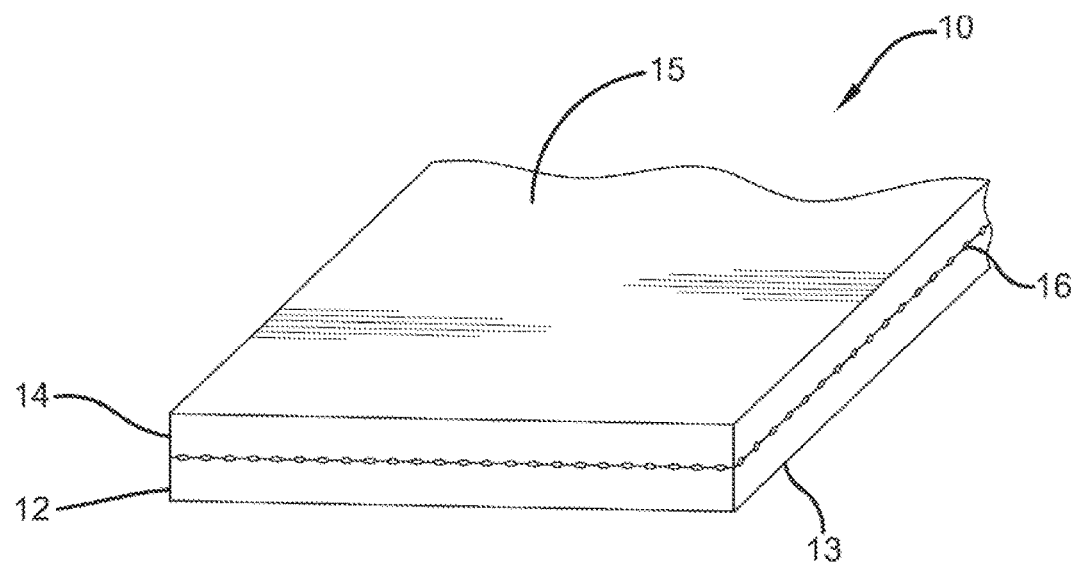
FIG. 1 is a perspective view of a laminate membrane according to embodiments of the present invention.
Figure 2:
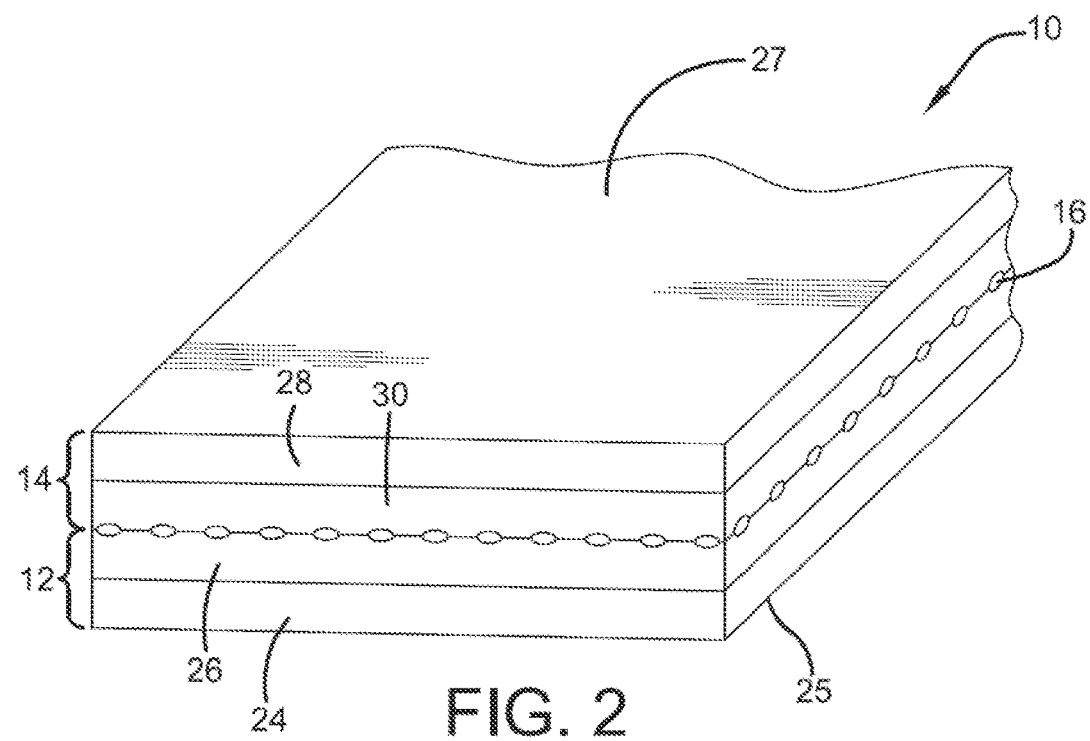
FIG. 2 is a perspective view of laminate membrane according to embodiments of the present invention.

In one or more embodiments, the membranes of the present invention include at least two thermoplastic layers laminated to one another with an optional scrim disposed between the layers. An exemplary membrane according to the present invention is shown in FIGS. 1 and 2 as membrane 10 having first or lower layer 12, a second or upper layer 14, and optional scrim 16 disposed there between. Lower layer 12 includes lower planar surface 13 and upper layer 14 includes upper planar surface 15. According to aspects of the present invention, lower planar surface 13 is abraded or is otherwise treated to expose mineral filler contained with the lower layer 12.

In one or more embodiments, the membranes of the present invention are multi-layered membranes that include one or more coextruded layers. In this respect, U.S. Publ. Nos. 2009/0137168, 2009/0181216, 2009/0269565, 2007/0193167, and 2007/0194482 are incorporated herein by reference. For example, and with reference to FIG. 2, lower or bottom layer 12 includes coextruded layers 24 and 26, and upper layer 14 optionally includes coextruded layers 28 and 30. Lower layer 12 and upper layer 14 may be laminated to each other with optional scrim 16 disposed there between. In one or more embodiments, coextruded layer 24, which may be referred to as bottom coextruded layer 24, includes a bottom planar surface 25, which according the present invention is abraded or otherwise treated to expose mineral filler contained within layer 12. Coextruded layer 28, which may be referred to as top coextruded layer 28, includes top planar surface 27. In certain embodiments, layers 24 and 26 are compositionally the same.

In one or more embodiments, the thickness of coextruded layers 24 and 26 may be the same or substantially similar. In other embodiments, the thickness of coextruded bottom layer 24 may be thinner than coextruded upper layer 24.

In one or more embodiments, the overall thickness of the membranes of the present invention may be from about 20 mils up to about 100 mils, and in certain embodiments from about 30 mils to about 80 mils. The layers (e.g., layers 12 and 14) may each account for about half of the overall thickness (e.g., 10 mils to about 40 mils), with a small fraction of the overall thickness (e.g., about 5 mils) deriving from the presence of the scrim. Where the membrane includes one or more coextruded layers, the bottom layer 24 may, in certain embodiments, have a thickness from about 2 mils to about 20 mils, or in other embodiments from about 4 mils to about 12 mils.

In one or more embodiments, the scrim may include conventional scrim. For example, polyester scrims may be employed. In these or other embodiments, polyester scrims including fiberglass reinforcement may be employed.

In one or more embodiments, the membranes of the present invention have sufficient properties to be useful in creating mechanically attached roofing systems that meet industry standards for wind uplift including FM 4470 and satisfy the requirements of ASTM D6878-03.

Constituents of the Membrane

Thermoplastic Component

In one or more embodiments, regardless of the number of layers or coextrudates of the membranes, each layer or coextrudate includes a thermoplastic polymer (excluding any scrim reinforcement), which may also be referred to as thermoplastic resins. The other ingredients or constituents of each layer may be dispersed within the thermoplastic polymer, and therefore reference may be made to a thermoplastic component that forms a matrix in which the other constituents are dispersed. As the skilled person appreciates, one or more layers of the thermoplastic membranes of the present invention compositionally include a thermoplastic component that forms a continuous phase (i.e., matrix) in which one or more additional materials may be dispersed.

In one or more embodiments, the thermoplastic resins are non-polar. In one or more embodiments, the thermoplastic resins may include olefin-based thermoplastics, such as polyolefins, of the type conventionally employed in the manufacture of thermoplastic membranes. Exemplary thermoplastic resins include, but are not limited to, thermoplastic olefinic polymers (TPOs), polyolefin blends, propylene-based elastomers, ethylene-based olefinic block copolymers, and/or functionalized polyolefin resins.

Thermoplastic Polyolefins (TPOS)

In one or more embodiments, the thermoplastic olefinic polymer (TPO) include an olefinic reactor copolymer, which may also be referred to as in-reactor copolymers. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. Other useful thermoplastic olefins include those available under the tradename T00G-00 (Ineos). In one or more embodiments, the in-reactor copolymers may be physically blended with other polyolefins. For example, in reactor copolymers may be blended with linear low density polyethylene.

Polyolefin Blends

In one or more embodiments, the thermoplastic component may include a physical blend of chemically-distinct olefinic polymers. In one or more embodiments, blends of propylene-based thermoplastic polymer, plastomer, and/or low density polyethylene may be used. Useful blends include those described in International Application No. PCT/US06/033522 which is incorporated herein by reference. In other embodiments, the thermoplastic olefinic component is a blend of a linear low density polyethylene and a propylene-based plastic.

In one or more embodiments, the plastomer includes an ethylene-α-olefin copolymer. The plastomer employed in one or more embodiments of this invention includes those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The α-olefin employed in preparing the plastomer of one or more embodiments of this invention may include butene-1, pentene-1, hexene-1, octene-1, or 4-methyl-pentene-1. The plastomer of one or more embodiments of this invention may be prepared by using a single-site coordination catalyst including metallocene catalysts, which are conventionally known in the art.

Useful plastomers include those that are commercially available. For example, plastomer can be obtained under the tradename EXXACT™ 8201 (ExxonMobil); or under the tradename ENGAGE™ 8180 (Dow DuPont). In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention may be prepared by using a convention Ziegler Natta coordination catalyst system. Useful linear low density polyethylene includes those that are commercially available. For example, linear low density polyethylene can be obtained under the tradename Dowlex™ 2038, 2045, and 2267G (Dow); under the tradename DFDA-1010 NT7 (Dow); or under the tradename GA502023 (Lyondell); or under the tradename LLDPE LL (ExxonMobil).

Propylene-Based Elastomers

In one or more embodiments, useful propylene-based elastomers include propylene-based elastomers that have isotactic propylene sequences long enough to crystallize. In this regard, U.S. Pat. No. 6,927,258, and U.S. Publ. Nos. 2004/0198912 and 2010/0197844 are incorporated herein by reference. In one or more embodiments, the propylene-based elastomer is propylene/alpha-olefin copolymer with semi-crystalline isotactic propylene segments. The alpha-olefin content (e.g. polymerized ethylene content) may range from about 5 to about 18%, or in other embodiments from about 10 to about 15%.

In one or more embodiments, the propylene-based elastomer is characterized by a melting point that is less than 110° C. and a heat of fusion of less than 75 J/g. In one embodiment, the propylene based elastomers of the present invention have a glass transition temperature (Tg) range of about −25 to −35° C. The Tg as used herein is the temperature above which a polymer becomes soft and pliable, and below which it becomes hard and glassy. The propylene based plastomers and elastomers of the present invention have a MFR range measured at 230° C. of between about 0.5 to about 25, and a melt temperature range of about 50 to 120° C. In one embodiment, the propylene based elastomers of the present invention have a shore A hardness range of about 60 to about 90.

In one or more embodiments, the propylene-based elastomer is blended with a propylene-based thermoplastic resin, which may include a crystalline resin. In particular embodiments, the propylene-based thermoplastic resin is characterized by a melting point that is greater than 110° C. and a heat of fusion greater than 75 J/g. In one or more embodiments, the propylene-based thermoplastic resin is stereoregular polypropylene. In one or more embodiments, the ratio of the propylene-based elastomer to the propylene-based thermoplastic resin within the blend composition may vary in the range of 1:99 to 95:5 by weight and, in particular, in the range 2:98 to 70:30 by weight.

In one embodiment, the propylene-based elastomers may have a flexural modulus range of about 500 to about 6000 psi, or in other embodiments about 1500-5000 psi.

Ethylene-Based Olefinic Block Copolymers

As suggested above, at least one layer of the thermoplastic membranes of this invention include the ethylene-based olefinic block copolymer, optionally together with a distinct polyolefin such as linear low-density polyethylene. Where the membrane includes additional layers that are devoid or substantially devoid of the ethylene-based olefinic block copolymer, these additional layers may include thermoplastic polymers conventionally employed in the preparation of thermoplastic membranes. For example, these additional layers may include polypropylene-based thermoplastic polymers such as propylene-based thermoplastic polyolefins or propylene-based elastomers.

Useful ethylene-based olefinic block copolymers that may be employed in the present invention are known in the art as described in U.S. Pat. Nos. 7,893,166 and 7,355,089 and U.S. Publ. No. 2010/0084158, which are incorporated herein by reference. Useful ethylene-based olefinic block copolymers are commercially available under the tradename INFUSE (Dow Chemical Company).

Functionalized Thermoplastic Resin

As suggested above, one or more layers of the membranes of the present invention may include a functionalized thermoplastic resin. In one or more embodiments, the functionalized polymer is a thermoplastic polymer that includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester halide, amine, imine, nitrile, oxirane (e.g., epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_C$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 10% by weight, in other embodiments less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (Du- Pont), POLYBOND™ (Crompton), and EXXELOR™ (ExxonMobil). Another examples includes polymers or oligomers including one or more glycidyl methacrylate groups such as Lotader™ AX8950 (Arkema).

Mineral Fillers

As indicated above, at least the bottom layer of the membranes of the present invention include a filler (e.g. a mineral filler). In particular embodiments, the cap layer and the bottom layer include mineral filler. In other embodiments all layers of the membrane include mineral filler. In one or more embodiments, the mineral fillers include inorganic materials that may aid in reinforcement, heat aging resistance, green strength performance, and/or flame resistance. In other embodiments, these materials are generally inert with respect to the composition and therefore simply act as diluent to the polymeric constituents. In one or more embodiments, mineral fillers include clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, and mixtures thereof. In one or more embodiments, the fillers are not surface modified or surface functionalized.

Suitable clays may include airfloated clays, water-washed clays, calcined clays, surface-treated clays, chemically-modified clays, and mixtures thereof.

Suitable silicates may include synthetic amorphous calcium silicates, precipitated, amorphous sodium aluminosilicates, and mixtures thereof.

Suitable silica (silicon dioxide) may include wet-processed, hydrated silicas, crystalline silicas, and amorphous silicas (noncrystalline).

In one or more embodiments, the mineral fillers are characterized by an average particle size of at least 1 µm, in other embodiments at least 2 µm, in other embodiments at least 3 µm, in other embodiments at least 4 µm, and in other embodiments at least 5 µm. In these or other embodiments, the mineral fillers are characterized by an average particle size of less than 15 µm, in other embodiments less than 12 µm, in other embodiments less than 10 µm, and in other embodiments less than 8 µm. In these or other embodiments, the mineral filler has an average particle size of between 1 and 15 µm, in other embodiments between 3 and 12 µm, and in other embodiments between 6 and 10 µm.

Other Ingredients

The thermoplastic membranes of the present invention (e.g., one or more layers of the membranes) may also include other ingredients, such as those that are conventional in thermoplastic membranes. For example, other useful additives or constituents may include flame retardants, stabilizers, pigments, and fillers.

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle).

In one or more embodiments, the use of char-forming flame retardants (e.g. ammonium polyphosphate and melamine polyphosphate) has unexpectedly shown advantageous results when used in conjunction with nanoclay within the cap layer of the laminates of the present invention. It is believed that there may be a synergistic effect when these compounds are present in the cap layer. As a result, the cap layer of the laminates of the certain embodiments of the present invention are devoid of or substantially devoid of halogenated flame retardants and/or flame retardants that release water upon thermal decomposition. Substantially devoid referring to that amount or less that does not have an appreciable impact on the laminates, the cap layer, and/or the burn resistivity of the laminates.

In one or more embodiments, the membranes of the invention may include a stabilizers. Stabilizers may include one or more of a UV stabilizer, an antioxidant, and an antiozonant. UV stabilizers include Tinuvin™ 622. Antioxidants include Irganox™ 1010.

In one or more embodiments, one or more layers of the membranes of the present invention may include expandable graphite, which may also be referred to as expandable flake graphite, intumescent flake graphite, or expandable flake. Generally, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation. Expandable graphite useful in the applications of the present invention are generally known as described in International Publ. No. WO/2014/078760, which is incorporated herein by reference.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

In one or more embodiments, one or more layers of the membranes of the present invention include a nanoclay. Nanoclays include the smectite clays, which may also be referred to as layered silicate minerals. Useful clays are generally known as described in U.S. Pat. No. 6,414,070 and U.S. Pat. Publ. No. 2009/0269565, which are incorporated herein by reference. In one or more embodiments, these clays include exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate can facilitate the intercalation of the clay with other materials. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups are desirably present on the clay surface. Intercalation by absorption can take place when either acid or non-acid clays are used as the starting material. Cation exchange can take place if an ionic clay containing ions such as, for example, $Na^+$, $K^+$, $Ca^{++}$, $Ba^{++}$, and $Li^+$ is used. Ionic clays can also absorb dipolar organic molecules.

Smectite clays include, for example, montmorillonite, saponite, beidellite, hectorite, and stevensite. In one or more embodiments, the space between silicate layers may be from about 15 to about 40×, and in other embodiments from about 17 to about 36×, as measured by small angle X-ray scattering. Typically, a clay with exchangeable cations such as sodium, calcium and lithium ions may be used. Montmorillonite in the sodium exchanged form is employed in one or more embodiments Organic swelling agents that can be used to treat the clay include quaternary ammonium compound, excluding pyridinium ion, such as, for example, poly(propylene glycol)bis (2-aminopropyl ether), poly(vinylpyrrolidone), dodecylamine hydrochloride, octadecylamine hydrochloride, and dodecylpyrrolidone. These treated clays are commercially available. One or more of these swelling agents can be used.
Amounts As discussed above, a planar surface of the membranes of the present invention are abraded or otherwise treated to expose mineral filler contained with the layer forming the exposed planar surface of the membrane. In one or more embodiments, the layer forming the surface that is abraded or otherwise treated includes greater than 5, in other embodiments greater than 10, in other embodiments greater than 15 weight percent, in other embodiments greater than 20 weight percent, in other embodiments greater than 25 weight percent, in other embodiments greater than 30 weight percent, in other embodiments greater than 33 weight percent, in other embodiments greater than 40 weight percent, and in other embodiments greater than 45 weight percent of the mineral filler based on the entire weight of the given layer of the membrane that includes the filler. In one or more embodiments, the layer forming the surface that is abraded or otherwise treated includes less than 80 weight percent, in other embodiments less than 70 weight percent, and in other embodiments less than 60 weight percent of the filler based on the entire weight of the given layer of the membrane that includes the filler. In one or more embodiments, the layer forming the surface that is abraded or otherwise treated includes from about 5 to about 80, in other embodiments from about 10 to about 70, and in other embodiments from about 20 to about 60 weight percent of the filler based upon the entire weight of the given layer of the membrane that includes the filler.

Method of Making

In one or more embodiments, the compositions and membranes of the present invention may be prepared by employing conventional techniques. The polymeric composition that may be extruded to form the polymeric sheet may include the ingredients or constituents described herein. For example, the polymeric composition may include thermoplastic polyolefin, filler, and the other optional ingredients defined herein. The ingredients may be mixed together by employing conventional polymer mixing equipment and techniques. In one or more embodiments, an extruder may be employed to mix the ingredients. For example, single-screw or twin-screw extruders may be employed. The various ingredients can be separately fed into a reaction extruder and pelletized or directly extruded into membrane or laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered with the scrim sandwiched there between to form a laminate. In one or more embodiments, one or more layers of the membranes of the present invention are prepared by employing coextrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or optionally rolled for storage.

Exposure of Mineral Fillers

In accordance with practice of this invention, the thermoplastic membrane (or a surface thereof) is subjected to mechanical treatment to provide a planar surface that includes exposed mineral filler. This surface may be referred to as an abraded surface. Generally, it is believed that the membrane surface has limited exposed mineral filler following the extrusion process due to the presence of a film or layer of thermoplastic resin across the surface of the membrane; e.g. a film or layer having a thickness of at least 0.5 µm coats the planar surface of the membrane. Mechanical treatment according the present invention at least partially removes this film or layer to expose the mineral filler to the surface.

In one or more embodiments, mechanical treatment of a surface of the membrane takes place as part of the manufacturing process of the membrane. In other embodiments, the mechanical treatment of a surface of the membrane takes place as part of a post-manufacturing process (e.g. after winding, storage, and/or shipment of the membrane). In either event, the mechanical treatment of a surface of the membrane takes place at membrane temperatures (i.e. the temperature of the surface of the membrane being treated) below those temperatures that would otherwise frustrate the abrading process. For example, in one or more embodiments, the mechanical treatment takes place below the melt temperature of the thermoplastic material forming the skin or layer. In one or more embodiments, mechanical treatment takes place at temperatures less than 100° C., in other embodiments less than 50° C., and in other embodiments less than 30° C. In one or more embodiments, mechanical treatment takes place at membrane temperatures of form about 0° C. to about 100° C., in other embodiments from about 10° C. to about 50° C., and in other embodiments from about 15° C. to about 30° C.

In one or more embodiments, mechanical treatment of the surface of the membrane can be accomplished by abrading, sanding, or shaving the surface of the membrane. This step can be accomplished by contacting the surface with a sanding, abrading, or shaving element. In one or more embodiments, these elements may include a file or knurled surface. For example, single-cut or double-cut filed or knurled surface elements may be employed. In other embodiments, these elements may include abrasive surfaces such as, but not limited to, diamond, ceramic, aluminum oxide, or silicon oxide file elements or other coated abrasives or sanding elements such as sandpaper (e.g. aluminum oxide paper or silicon carbide paper). In yet other embodiments, the elements include bristled devices such as wire brushes. In one or more embodiments, these elements are static or stationary devices that treat the surface of the membrane by contacting and passing the membrane across the surface of the element. In other embodiments, the elements are dynamic or active (e.g. rotating) to thereby impart greater force or otherwise more efficiently impact the surface of the membrane to thereby abrade the surface thereof.

In one or more embodiments, at least a substantial portion of the surface of the membrane is mechanically treated to expose the mineral filler. In particular embodiments, at least 80%, in other embodiments at least 90%, and in other embodiments at least 98% of the surface area of a surface of the membrane is treated to thereby expose mineral filler.

Figure 3:
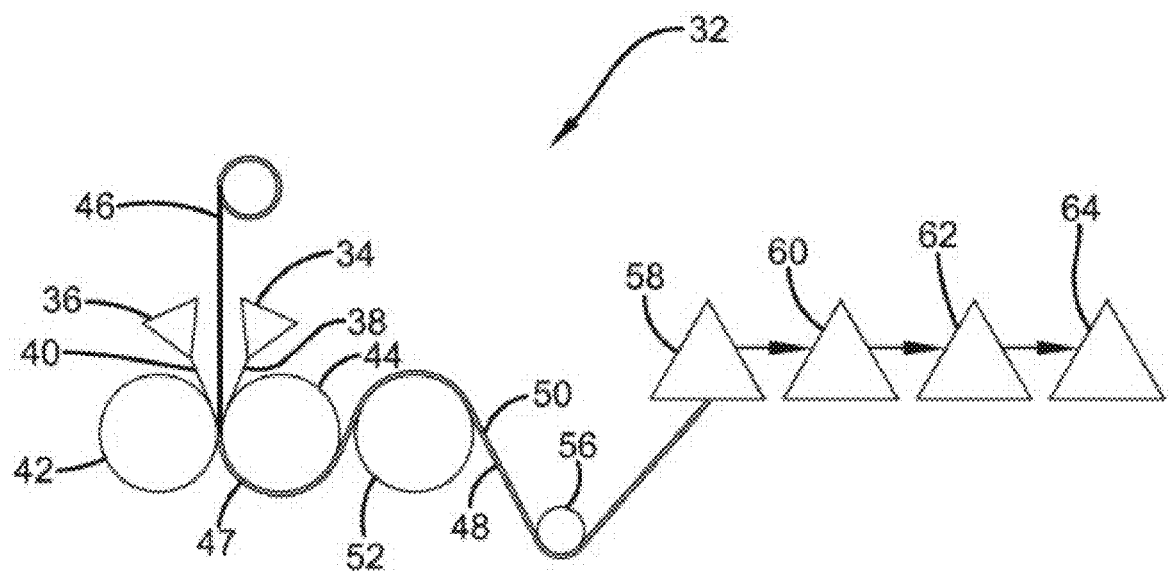
FIG. 3 is a schematic view of a process for producing membrane according to embodiments of the invention.

An exemplary process for producing membrane according to the present invention can be described with reference to FIG. 3, which shows process configuration 32 including first extrusion die 34 and second extrusion die 36. First extrusion die 34 produces first thermoplastic sheet 38, and second extrusion die 36 produces second thermoplastic sheet 40. First thermoplastic sheet 38 includes mineral filler (not shown). The skilled person will appreciate that where first thermoplastic sheet 38 is a coextruded sheet, at least the outer layer thereof will include mineral filler. First and second dies 34, 36 feed first and second sheets 38, 40 to a pair of nip rolls 42, 44, which also receive reinforcing fabric 46 between sheets 38, 40. The sandwiching of fabric 46 between first and second sheets 38, 40, while sheets 38, 40 are in a molten state, thereby laminates sheets 38, 40 with fabric 46 sandwiched there between to produce bilaminate sheet 47 having first surface 48 and second surface 50. Bilaminate sheet 47 is then routed around rolls 44 and 52, which are chilled rolls that serve to cool the membrane. Bilaminate membrane 47 is then tensioned around a rotating, knurled rod 56, which abrades second surface 50 and thereby exposes mineral filler contained therein. Following the mechanical treatment of surface 50 by knurled rod 56, membrane 47 can be processed by conventional means, which includes, for example, accumulating 58 within a series of rolls, winding 60, storage 62, and shipping 64.

INDUSTRIAL APPLICABILITY

As indicated above, the membranes of one or more embodiments of the present invention are useful for roofing membranes for covering flat or low-sloped roofs to thereby form a roofing system. These roof systems are generally known in the art as disclosed in U.S. Ser. Nos. 60/586,424 and 11/343,466, and International Application No. PCT/US2005/024232, which are incorporated herein by reference. Advantageously, the membranes of one or more embodiments of the present invention may be used to form fully-adhered roofing systems through the use of polar adhesives even though the membranes of this invention are devoid of fabric backings, which backings are conventionally present when polar adhesives are employed.

Figure 4:
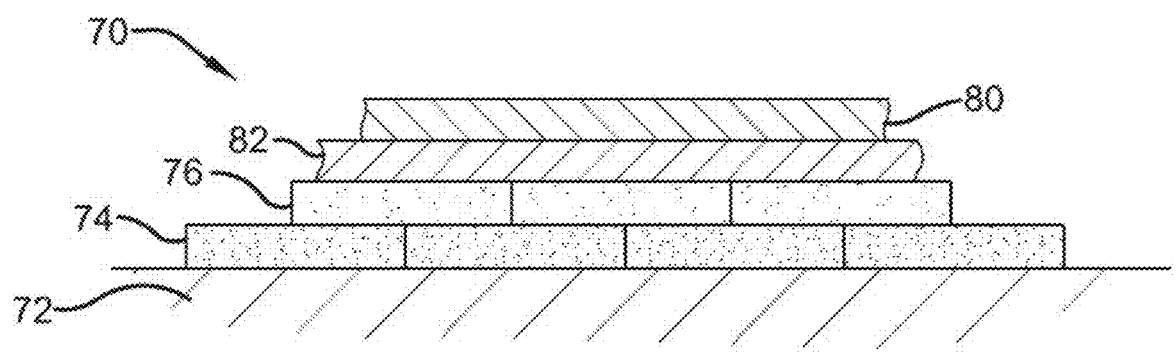
FIG. 4 is a cross-sectional view of a fully-adhered roofing system according to embodiments of the present invention.

In one or more embodiments, roof systems can be described with reference to FIG. 4, which shows adhered-roofing system 70 including roof deck 72, optional insulation layer 74, optional coverboard layer 76, thermoplastic membrane 80, and adhesive layer 82. Advantageously, the membranes of the present invention can be used to prepare adhered roofing systems, including fully-adhered systems and partially-adhered systems. In this regard, at least a portion of the abraded or otherwise treated surface of the lower most portion of the membrane is adhesively mated to the substrate through a polar adhesive. Namely, membrane 80 is adhesively secured to the substrate through adhesive layer 82. The substrate may include one or more of an existing membrane (not shown), coverboard 76, insulation layer 74, or roof deck 72. As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e., the substrate-contacting planar surface of the membrane) is adhered to the substrate through an adhesive.

Generally, these roof systems are formed by applying the polar adhesive to the roof substrate to form a layer of adhesive, and then the membranes of the present invention, which are devoid of any fleece backing, can subsequently be contacted to the layer of adhesive disposed on the substrate. The polar adhesive then cures, such as by reaction with atmospheric water, to produce a cured residue of the adhesive composition that binds or is otherwise adhesively mated to the roof substrate and the membrane. Advantageously, the process can be used to construct roofing systems that meet the standards of UL and Factory Mutual for wind uplift in the absence of a fleece or other backing material applied to the membrane.

In one or more embodiments, the roof deck may include steel, concrete, and/or wood. In these or other embodiments, the membranes may be applied over additional materials, such as insulation boards and cover boards. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood. In yet other embodiments, the membranes may be applied over existing membranes. These existing membranes may include cured rubber systems such as EPDM membranes, thermoplastic polymers systems such as TPO membranes, or asphalt-based systems such as modified asphalt membranes and/or built roof systems.

Practice of this invention is not limited by the selection of any particular roof deck. Accordingly, the roofing systems herein can include a variety of roof decks. Exemplary roof decks include concrete pads, steel decks, wood beams, and foamed concrete decks.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573, 092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which is incorporated herein by reference. In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510 which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

Polar Adhesives

In one or more embodiments, the membranes of the present invention may be adhered to a roof substrate, or seamed to adjacent membranes within a roofing system, by us of a polar adhesive system. These adhesive systems may advantageously be applied to a roof substrate as a liquid or foam. In one or more embodiments, these polar adhesive systems may include, but are not limited to, polysiloxane adhesives, silicon-terminated polymers or functionalized polymers, and isocyanate-reactive adhesive systems. As is known in the art, these adhesive systems may also include a tackifier resin, an adhesion promoter, a filler, a catalyst, an antioxidant, a stabilizer, a moisture scavenger, a crosslink inhibitor (a.k.a retarder), a plasticizer, and/or a thixotropic compound. In one or more embodiments, the adhesive composition is a 100% solids composition (i.e. it is solvent free). Adhesive compositions of this nature are described in International Publication No. WO 2014/145482 and U.S. Pat. No. 7,767,308, which are incorporated herein by reference.

In one or more embodiments, the polymers having silicon-containing hydrolyzable terminal groups may include silane-terminated polymers, which may also be referred to as silyl-terminated polymers. The term "silicon-containing hydrolyzable terminal group" as used herein means a group wherein at least one silicon atom is combined with a hydrolyzable group such as a methoxy group which is subject to hydrolysis and polymerization by moisture. The backbone of the polymer having silicon-containing hydrolyzable terminal groups may be comprised of polyethers, polyesters, polyurethanes (SPUR), or other suitable backbones.

Suitable polymers having silicon-containing hydrolyzable terminal groups are commercially available and/or can be prepared in accordance with techniques known in the art. Examples of suitable commercially available polymers having silicon-containing hydrolyzable terminal groups are Geniosil™. STP-E 35 trimethoxysilylpropyl-carbamate-terminated polyether, and Geniosil™. STP-E 30 silane-terminated polyether with dimethoxy(methyl)silylmethylcarbamate terminal groups, both of which are available from Wacker Chemical. Another commercially available polymer having silicon-containing hydrolyzable terminal groups that may be employed in the adhesive compositions of this invention is "SPUR+" silane-terminated polyurethanes, which are available from Momentive. Another suitable commercially available material is "MS" silyl-terminated polyether (S227H, S303, S327, S303H, SAX350), available from Kaneka.

In one or more embodiments, the tackifier resin is a hydrocarbon resin. In other embodiments, the tackifier resin is a phenolic resin.

In one or more embodiments, the hydrocarbon resins may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer include styrene, indene, derivatives of styrene, derivatives of indene, and combinations thereof.

In one or more embodiments, examples of hydrocarbon resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In certain embodiments, the synthetic aliphatic or aromatic hydrocarbon resins may be characterized by a number average molecular weight ($M_n$) of from about 300 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer. In particular embodiments, the dicyclopentadiene tackifier resin is hydrogenated. Hydrogenated dicyclopentadiene tackifier resins are commercially available from Neville.

In one or more embodiments, synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized.

The hydrocarbon resins may be characterized by an aromatic content of from about 1 to about 60, in other embodiments from about 2 to about 40, and in other embodiments from about 5 to about 10. In one or more embodiments, the tackifier resins are hydrogenated or partially hydrogenated; useful resins include those that are at least 50 percent, in other embodiments at least 80 percent, in other embodiments at least 95 percent, and in other embodiments at least 99 percent or fully hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the hydrocarbon resin may be characterized by a softening point of from about 5° C. to about 210° C., in other embodiments from about 65° C. to about 170° C., and in other embodiments from about 90° C. to about 140° C. Softening point can be determined according to ASTM E-28 (Revision 1996).

In these or other embodiments, the hydrocarbon resin may be characterized by a glass transition temperature of less than 120° C., in other embodiments less than 110° C., and in other embodiment from about −40° C. to about 80° C. Glass transition temperature may be determined according to ASTM D 341-88 by using differential scanning calorimetry.

In these or other embodiments, the hydrocarbon resin may be characterized by a Saponification number (mg KOH/g resin material) of greater than 10, in other embodiments greater than 15, and in other embodiments greater than 19.

In these or other embodiments, the hydrocarbon resin may be characterized by an acid number greater than 10, in other embodiments greater than 15, and in other embodiments greater than 20, and in other embodiments greater than 25.

In particular embodiments, the tackifier resin is a phenolic resin. In one or more embodiments, the phenolic resins that may be employed in the compositions of this invention include resol-type and novolak-type phenolic resins obtained by condensation reaction of phenolic compounds, e.g., phenol, cresol, xylenol, resorcinol, an alkylphenol, and a modified phenol such as cashew nut shell oil modified phenol or tall oil modified phenol, with aldehyde compounds, e.g., formaldehyde and paraformaldehyde; and nitrogen-containing phenol resins obtained by condensation reaction of the above-mentioned phenolic compounds and aldehyde compounds in the presence of a catalyst such as ammonia or an amine compound. The phenol resins may be employed alone or in admixture. In one or more embodiments, the term phenolic resin refers to a phenol-formaldehyde resin. For example, the term phenolic resin may include a novolac resin, which is a phenol-formaldehyde resin where the molar ratio of the formaldehyde to phenol is less than one. These resins are typically synthesized by using an acid catalyst. The term phenolic resin also refers to resol resins wherein the molar ratio of the formaldehyde to phenol is greater than one. These resins are typically synthesized by using a base catalyst.

In one or more embodiments, the adhesion promoter includes a non-polymeric silicon-containing hydrocarbon compound that has a lower molecular weight than the polymer having a silicon-containing hydrolysable group (i.e. the silane-terminate polymer). Also, the adhesion promoter includes at least one hydrolyzable group capable of reacting with a hydrolyzed functional group on the polymer having silicon-containing hydrolyzable terminal groups, and includes at least one moiety capable of interacting (i.e., promoting adhesion) with materials that are to be bonded with one another (such as a rubber membrane material). The expression non-polymeric, as used to modify the silicon-containing hydrocarbon compound is meant to exclude polymers and copolymers having at least 10 repeat units or monomeric units, such as urethane prepolymers having silicon-containing hydrolyzable terminal groups, but is meant to encompass oligomeric silicon-containing hydrolyzable compounds having fewer than 10 repeat units or monomers, and which are useful for promoting adhesion between a substrate and a cured adhesive composition. Examples of suitable aminosilane adhesion promoters that may function as the non-polymeric silicon-containing hydrolyzable compound include, but are not limited to gamma-aminopropyltrimethoxysilane, gamma-aminopropyltriethoxysilane, gamma-(aminoethyl)-aminopropyltrimethoxysilane, methylaminopropyldimethoxysilane, methyl-gamma-(aminoethyl)-aminopropyldimethoxysilane, gamma-dimethylaminopropyltrimethoxysilane, and the like.

In one or more embodiments, examples of a plasticizer include phthalic acid esters (such as dioctyl phthalate, diisooctyl phthalate, dibutyl phthalate, diundecyl phthalate, diisononyl phthalate, diisodecyl phthalate, diisodocecyl phthalate and butylbenzyl phthalate); aliphatic dibasic acid esters (such as dioctyl adipate, isodecyl succinate, and dibutyl sebacate); glycol esters (such as diethylene glycol dibenzoate and pentaerythritol ester); aliphatic esters (such as butyl oleate and methyl acetylricinoleate); phosphoric acid esters (such as tricresyl phosphate, trioctyl phosphate, and octyldiphenyl phosphate); epoxy plasticizers (such as epoxidated soybean oil, epoxidated linseed oil, and benzyl epoxystearate); polyester plasticizers (such as polyesters of dibasic acid and a divalent alcohol); polyethers (such as polypropylene glycol and its derivatives); polystyrenes (such as poly-α-methylstyrene and polystyrene); polybutadiene butadiene-acrylonitrile copolymer; polychloroprene; polyisoprene; polybutene; chlorinated paraffins; benzoic esters; glycol esters; phosphoric esters; sulfonic esters; and mixtures thereof, wherein any given compound is different than an ingredient otherwise included in the composition of the invention.

In addition, high-molecular weight plasticizers can also be used. Specific examples of such high-molecular weight plasticizer include, but are not limited to, vinyl polymers obtainable by polymerizing a vinyl monomer by various methods; polyalkylene glycol esters such as diethyl ene glycol dibenzoate, triethylene glycol dibenzoate and pentaerythritol esters; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; polyethers such as polyether polyols, e.g. polyethylene glycol, polypropylene glycol and polytetramethylene glycol that have a molecular weight of 500 or more, and even further 1,000 or more, and derivatives of these as obtainable by converting the hydroxyl groups of these polyether polyols to an ester, ether or the like groups; polystyrenes such as polystyrene and poly-α-methylstyrene; polybutadiene, polybutene, polyisobutylene, butadiene-acrylonitrile, polychloroprene and the like. In one or more specific embodiments, plasticizers include propylene glycol dibenzoate, diisononyl phthalate, and soy methyl esters, Mesamol II, HB-40, butylbenzylphthalate. In other specific embodiments, the plasticizers employed are phthalic acid esters. In one or more embodiments, the plasticizers may include high boiling solvents that promote tackification, lowering of viscosity, and sprayability.

In one or more embodiments, a moisture scavenger is employed in the adhesive compositions of this invention. Moisture scavengers that may be employed include chemical moisture scavengers and physical moisture scavengers that absorb and/or adsorb moisture. In particular embodiments, the chemical moisture scavenger is vinyl-trimethoxysilane, which may be employed in an amount of up to about 3% by weight based on the total weight of the adhesive composition. An example of a physical moisture scavenger that may be employed is 3A Sieves from UOP, which is a zeolite having 3 Angstrom pores capable of trapping moisture. Other moisture scavengers that may be employed include oxazoladines and calcium oxide.

In one or more embodiments, suitable thixotropic agents may include, but are not limited to, polyvinylpyrrolidone, titanate coupling agents, metal soaps (such as calcium stearate, aluminum stearate, and barium stearate, aluminum distearate, and aluminum tristearate), copolymers with acidic groups, compounds having ionic groups, fumed silica, colloidal silica, asbestine, organic derivatives of castor oil (such as hydrogenated castor oil derivatives), treated clays, organic bentonite, modified polyester polyols (such as polyoxyethylene-polyoxypropylene block copolymers), aliphatic amides, and polyamides (such as polyamide waxes). Specific examples include polyamide waxes, such as "Crayvallac SLX" available from Arkema, or polymerized castor oils such as Flowtone R from Crayvalley.

Antioxidants that may be employed if desired. Examples of useful antioxidants include hindered phenols and phosphate esters.

Generally, any compatible filler, such as calcium carbonate may be employed if desired for a particular application. As the skilled person will appreciate, fillers will generally be omitted when the adhesive composition is intended to be sprayed onto one surface that is subsequently applied to a second surface on which the adhesive is or is not deposited.

As mentioned above, the adhesive composition may include one or more catalysts for the purpose of promoting the crosslinking the silane-terminated polymer. Without wishing to be bound by any particular theory, it is believed that these catalysts promote the hydrolysis and condensation of organosilicon compounds (i.e., reactions between the terminal groups of the polymer having silicon-containing hydrolyzable terminal groups, and reactions between the optional adhesion promoter when present and the polymer having silicon-containing hydrolyzable terminal groups). In one or more embodiments, hydrolysis of organosilicon compounds may be catalyzed by either acids or bases. Useful basic catalysts that may be employed in the compositions of this invention include alkali metal hydroxides such as potassium hydroxide, silanolates such as lithium silanolate, organic amines, and Lewis bases such as alkali metal carbonates and bicarbonates. Suitable acid catalysts include mineral acids such as sulfuric and phosphoric acids, organic acids such as acetic, propanoic and methane sulfonic acids.

Other suitable acid catalysts include Lewis acids such as aluminum chloride, organotin compounds such as dibutyl tin dilaurate and titanium compounds such as the alkyl ortho esters, including tetrabutyl titanate.

In one or more embodiments, the adhesive composition employed in this invention are advantageously devoid or substantially devoid of a solvent. As used herein, the term solvent refers to a volatile liquid that is either a VOC or VOC exemption liquid. Examples of solvents that are excluded include toluene and acetone.

In one or more embodiments, the silicon-containing adhesive compositions used in this invention include at least 25 wt %, in other embodiments at least 30%, and in other embodiments at least 35 wt. % silane-terminated polymer. In these or other embodiments, these adhesive compositions include at most 80%, in other embodiments at most 75%, and in other embodiments at most 70% wt. % silane-terminated polymer. In one or more embodiments, the adhesive compositions of the invention include from about 25% to about 80%, in other embodiments from about 30% to about 75%, and in other embodiments from about 35% to about 70% wt % silane-terminate polymer.

In one or more embodiments, the silicon-containing adhesive compositions used in this invention include at least 1%, in other embodiments at least 3%, and in other embodiments at least 5% wt % tackifier resin (e.g., hydrocarbon resin). In these or other embodiments, these adhesive compositions include at most 30%, in other embodiments at most 25%, and in other embodiments at most 20% wt % tackifier resin (e.g., hydrocarbon resin). In one or more embodiments, these adhesive compositions include from about 1% to about 30%, in other embodiments from about 3% to about 25%, and in other embodiments from about 5% to about 20% wt % tackifier resin (e.g., hydrocarbon resin).

In one or more embodiments, the silicon-containing adhesive compositions used in this invention include at least 1%, in other embodiments at least 1.5%, and in other embodiments at least 2% wt % adhesion promoter. In these or other embodiments, these adhesive compositions include at most 10%, in other embodiments at most 9%, and in other embodiments at most 8% wt % adhesion promoter. In one or more embodiments, these adhesive compositions include from about 1% to about 10%, in other embodiments from about 1.5% to about 9%, and in other embodiments from about 2% to about 8% wt % adhesion promoter.

In one or more embodiments, the silicon-containing adhesive compositions used in this invention include at least 0.05%, in other embodiments at least 0.1%, and in other embodiments at least 0.15 wt % catalyst. In these or other embodiments, these adhesive compositions include at most 3%, in other embodiments at most 2.5%, and in other embodiments at most 2% wt % catalyst. In one or more embodiments, these adhesive compositions include from about 0.05% to about 3%, in other embodiments from about 0.1% to about 2.5%, and in other embodiments from about 0.15% to about 2% wt % catalyst.

In one or more embodiments, the silicon-containing adhesive compositions used in this invention include at least 0.25%, in other embodiments at least 0.5%, and in other embodiments at least 0.75 wt % moisture scavenger. In these or other embodiments, these adhesive compositions include at most 5%, in other embodiments at most 4%, and in other embodiments at most 3% wt % moisture scavenger. In one or more embodiments, these adhesive compositions include from about 0.25% to about 5%, in other embodiments from about 0.5% to about 4%, and in other embodiments from about 0.75% to about 3% wt % moisture scavenger.

In one or more embodiments, the silicon-containing adhesive compositions used in this invention include at least 5%, in other embodiments at least 10%, and in other embodiments at least 15% wt % plasticizer. In these or other embodiments, these adhesive compositions include at most 65%, in other embodiments at most 60%, and in other embodiments at most 55% wt % plasticizer. In one or more embodiments, these adhesive compositions include from about 5% to about 65%, in other embodiments from about 10% to about 60%, and in other embodiments from about 15% to about 55% wt % plasticizer.

In one or more embodiments, the silicon-containing adhesive compositions used in this invention may advantageously be 100% solids compositions. In one or more embodiments, these compositions may be devoid of solvent. In these or other embodiments, the adhesive compositions are substantially devoid of solvents, which refers to that amount of solvent or less that will not have an appreciable impact on the composition. In one or more embodiments, the compositions of this invention include less than 10%, in other embodiments less than 8%, and in other embodiments less than 5% wt % solvent.

In one or more embodiments, the tackifier resin may include a phenolic resin. In other embodiments, the adhesive composition is devoid of phenolic resins. In these or other embodiments, the adhesive compositions are substantially devoid of phenolic resin, which refers to that amount of solvent or less that will not have an appreciable impact on the composition. In one or more embodiments, the compositions of this invention include less than 3%, in other embodiments less than 2%, and in other embodiments less than 1% wt % phenolic resin.

In one or more embodiments, the polar adhesive system is a polyurethane adhesive that is applied to the roof deck, as the methods and techniques for applying the adhesive to the substrate, includes those polyurethane adhesives that are commonly used in the art. In this respect, U.S. Pat. No. 4,996,812 is incorporated herein by reference. As is known in the art, one type of polyurethane adhesive system employs an isocyanate component and a polyol component, with the two components typically being mixed in a mix apparatus, such as a spray nozzle. These systems are typically referred to as two-part polyurethane adhesives. In other embodiments, an isocyanate prepolymer is employed and curing of the prepolymer relies upon moisture within the atmosphere, rather than on the use of a polyol. These systems are typically referred to as one-part polyurethane adhesive systems.

In one or more embodiments, suitable isocyanates include, but are not limited to, aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4™ and 2,6'-isomers and mixtures thereof, 1,5-naphthalene diisocyanate, and 1,4™ diisocyanatobenzene. Exemplary isocyanate components include polymeric Rubinate 1850 (Huntsmen Polyurethanes), polymeric Lupranate M70R (BASF), and polymeric Mondur 489N (Bayer).

In one or more embodiments, suitable polyols include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one embodiment a polyester polyol is employed. In one or more embodiments, the present invention may be practiced in the appreciable absence of any polyether polyol. In certain embodiments, the ingredients are devoid of polyether polyols.

In addition to the isocyanate and the polyol, the adhesive system may also include flame retardants, catalysts, emulsifiers/solubilizers, surfactants, blowing agents, fillers, fungicides, anti-static substances, defoamers, water and other ingredients that are conventional in the art.

Catalysts are believed to initiate the polymerization reaction between the isocyanate and the polyol, as well as a trimerization reaction between free isocyanate groups when polyisocyanurate foam is desired. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Exemplary surfactants include silicone co-polymers or organic polymers bonded to a silicone polymer. Although surfactants can serve both functions, a more cost effective method to ensure emulsification/solubilization may be to use enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants.

Suitable emulsifiers/solubilizers include DABCO Kitane 20AS (Air Products), and Tergitol NP-9 (nonylphenol+9 moles ethylene oxide).

In one or more embodiments, the equivalent ratio of isocyanate groups to isocyanate-reactive groups (i.e. polyol functionality) introduced to prepare the developing foam is at least 2.7:1, in other embodiments at least 2.85:1, in other embodiments at least 3.0:1, in other embodiments at least 3.15:1, and in other embodiments at least 3.25:1. In these or other embodiments, the equivalent ratio of isocyanate groups to isocyanate-reactive groups is less than 3.6:1, in other embodiments less than 3.5:1, and in other embodiments less than 3.4:1. As those skilled in the art appreciate, the equivalent ratio refers to ratio of the number of moles of isocyanate groups in a given weight of isocyanate reactant to the number of moles of isocyanate-reactive groups in a given weight of isocyanate-reactive reactant.

In one or more embodiments, time is permitted between the application of the adhesive composition and application of the membrane panel. This time allows the foam reactants to react and begin to develop sufficient "cream," then rise. Generally, the membrane is applied during the cream time or the rise time, but before the tack-free time, which is the period of time when the adhesive loses sufficient green strength. In one or more embodiments, this time provided is less than 1 hour, in other embodiments less than 30 minutes, in other embodiments less than 10 minutes, and in other embodiments less than 3 minutes.

In one or more embodiments, the application of the adhesive composition to the substrate can be performed by completely covering the substrate with the adhesive. In other embodiments, the substrate may be partially covered. In one or more embodiments, the adhesive is applied to the roof substrate in the form of a bead that may be about ¼ to about 1 inch in diameter or thickness. The adhesive is then allowed to cream and then rise, which can expand the size of the bead up to 2-3 inches in thickness or diameter. The membrane can then be rolled out or otherwise applied to the substrate, which thereby further spreads the foam adhesive. In one or more embodiments, these beads may be applied in strips at a distance of from about 1 foot to about 3 feed (or even up to 5 feet) in distance from one another. Spacing of strips can be adjusted to achieve various wind uplift ratings.

Various modifications and alterations that do not depart from the scope and spirit of this invention will become apparent to those skilled in the art. This invention is not to be duly limited to the illustrative embodiments set forth herein.

What is claimed is:

1. A method of preparing a thermoplastic roofing membrane, the method comprising:
   (i) extruding a first composition including a thermoplastic polymer and a first mineral filler to form a first extrudate;
   (ii) extruding a second composition including a second thermoplastic polymer and a second mineral filler to form a second extrudate;
   (iii) forming the first and second extrudates into first and second sheets, each having first and second planar surfaces;
   (iv) positioning a reinforcing fabric between the first and second sheets;
   (v) laminating the first sheet to the second sheet to thereby sandwich the reinforcing fabric between the sheets to thereby form a laminate sheet, where the second planar surface of the first sheet and the first planar surface of the second sheet contact the reinforcing fabric;
   (vi) allowing the laminate sheet to at least partially cool; and
   (vii) mechanically treating the first planar surface of the first sheet to thereby expose the first mineral filler.

2. The method of claim 1, where said step of mechanically treating includes abrading, sanding, or shaving the first planar surface of the first sheet.

3. The method of claim 1, where said step of mechanically treating includes subjecting the first planar surface of the first sheet to a sanding, abrading, or shaving element.

4. The method of claim 1, where said step of mechanically treating includes subjecting the first planar surface of the first sheet to an abrading element, and where said abrading element includes a file or knurled surface.

5. The method of claim 1, where the first and second thermoplastic polymers are an olefinic polymer.

6. The method of claim 1, where the first and second thermoplastic polymers are selected from the group consisting of thermoplastic olefinic polymers (TPOs), polyolefin blends, propylene-based elastomers, ethylene-based olefinic block copolymers, and/or functionalized polyolefin resins.

7. The method of claim 1, where the first mineral filler is calcium carbonate.

8. The method of claim 1, where said step of allowing the laminate sheet to cool allows the sheet to cool below 100° C.

9. The method of claim 1, where the first planar surface of the first sheet is a substrate-contacting planar surface of the thermoplastic roofing membrane adapted to be adhered to a roof substrate, and where the second planar surface of the second sheet is a top planar surface adapted to be exposed to conditions exterior to the roof substrate.

10. The method of claim 7, where the second mineral filler is selected from the group consisting of clays, silicates, titanium dioxide, talc, mica, alumina trihydrate, antimony trioxide, titanium dioxide, silica, magnesium hydroxide, calcium borate ore, and mixtures thereof.

11. The method of claim 1, where greater than 80% of a surface area of the first planar surface of the first layer is treated to thereby expose the exposed mineral filler.

\* \* \* \* \*